A. BARR AND W. STROUD.
SELF CONTAINED BASE SINGLE OBSERVER HEIGHT MEASURING INSTRUMENT OF THE RANGE FINDER TYPE.
APPLICATION FILED MAR. 26, 1919.

1,312,014. Patented Aug. 5, 1919.
2 SHEETS—SHEET 1.

Inventors.
Archibald Barr.
William Stroud
By T. J. Walter Fowler
Atty.

ized Base Single-Observer Height-Measuring Instruments of the Range-Finder Type, of which the following is a specification.

UNITED STATES PATENT OFFICE.

ARCHIBALD BARR AND WILLIAM STROUD, OF ANNIESLAND, GLASGOW, SCOTLAND.

SELF-CONTAINED BASE SINGLE-OBSERVER HEIGHT-MEASURING INSTRUMENT OF THE RANGE-FINDER TYPE.

1,312,014. Specification of Letters Patent. Patented Aug. 5, 1919.

Application filed March 26, 1919. Serial No. 285,370.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Self-Contained Base Single-Observer Height-Measuring Instruments of the Range-Finder Type, of which the following is a specification.

This invention refers to self-contained base single-observer height measuring instruments of the range-finder type having a double telescope system and associated eyepiece system in each telescope of which a refracting prism of small angle is provided capable of translation along the axis of its telescope in the beam of light which passes from the objective to the eyepiece system for measurements appertaining to ranges, and for measurements appertaining to heights is so arranged that the angle which the principal plane of refraction of the prism makes with the plane of triangulation varies in such a manner as to be always equal to the angle between the line of sight and the vertical. In operating the instrument the two prisms are moved simultaneously toward or from the eyepiece system.

The general principle upon which instruments of this description operate for measuring heights is known and may be explained by considering the conditions appertaining to an instrument which for varying angles of sight is mounted capable of rotation about a horizontal axis containing the base of triangulation. In this case, if the refracting prisms are arranged so that the principal plane of refraction is maintained always in the plane of triangulation and adjustment of the prisms provided for each along the axis of its telescope only, ranges are always obtained for all angles of sight, and when used on a target in the zenith the principal plane of refraction is vertical, heights and ranges in this position being synonymous. If, however, provision is made for maintaining the principal plane of refraction always vertical, then, whatever the angle of sight, the indications obtained will be heights instead of ranges.

With instruments of this description working upon the coincidence or stereoscopic principle, the position of the refracting prisms for infinite height theoretically is at the common focal plane of the two telescopic objectives which would normally be on the eye side of the reflecting faces of the eyepiece system. Under these conditions it is not possible to translate the refracting prisms to the position corresponding to infinite height, a requirement which is desirable for various reasons, one of which being that the setting of the scale reading of the instrument may thereby be readily tested. Moreover, owing to the size of the prisms comprised in the eyepiece system it is not possible to bring the refracting prisms anywhere near the infinity position which means that the heights measurable are of very restricted magnitude.

For angles of sight varying from 0° to 90° the instrument may be mounted capable of rotation about a horizontal axis containing the base of triangulation, in which case the refracting prisms may each be suspended pendulum-wise so as to swing under gravity about an axis parallel to the base of the instrument, in which case the principal plane of refraction will be always vertical, or the instrument may be mounted capable of rotation about a horizontal axis at right angles to the base of triangulation, in which case the prisms may each be mounted in a carrier associated with gearing whereby the prism is turned about the axis of the base in the process of turning the rangefinder about the horizontal axis for varying angles of sight. This method may, if desired, be adopted in the former case instead of the pendulum system of control.

The object of this invention, which refers to instruments of the rangefinder type comprising refracting prisms adapted to operate in the manner described, is to provide means in the double telescope system whereby a condition corresponding to measurements appertaining to infinite height may be established.

According to this invention there is provided in one or in each of the telescopes of the double telescope system an auxiliary prism by which deviation equal to or slightly greater or less than that obtained by the two refracting prisms of the telescopes is produced, the auxiliary prism or each of them being fixed so far as translation along the axis of the telescope is concerned but being arranged to be rotated with varying angles of sight in the same way and to the same extent as the two refracting prisms, the disposition of a refracting prism and its associated auxiliary prism being such that at the infinity position the refraction produced by the one is annulled by that of the other.

Some examples according to this invention applied to instruments of the rangefinder type working on the coincidence principle will now be described with reference to the accompanying drawings, in which:—

Figure 1:
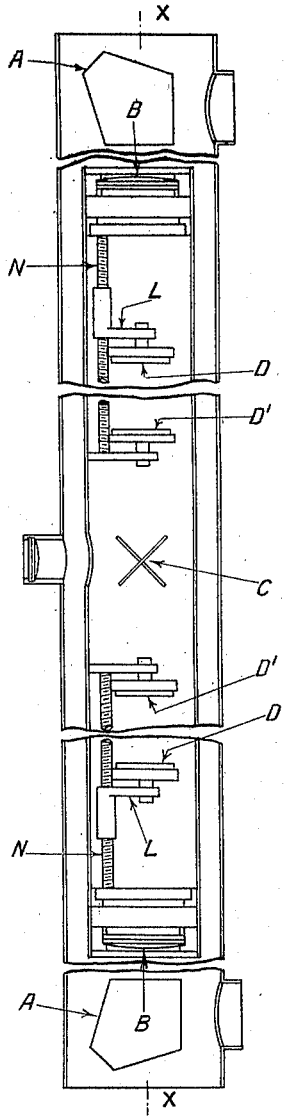
Figure 1 is a plan of a height measuring instrument.
Figure 2:
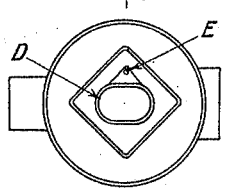
Fig. 2 is a sectional end elevation illustrating a part thereof.
Figure 3:
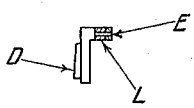
Fig. 3 is a sectional side elevation illustrating a detail of Fig 2.

The instrument illustrated at Figs. 1 and 2 is adapted to be rotated about a horizontal axis X X for varying angles of sight. In this construction A A designate the end reflectors, B B the objectives, C the eyepiece system, which, for simplicity, is illustrated diagrammatically as though it consisted of single plane reflectors, and D D designate the refracting prisms which are adapted to be moved to and fro along the axis X X for measurements appertaining to ranges, for which purpose each prism D is attached to a support L mounted on a screw shaft N. For measurements appertaining to heights, each prism D is mounted on its support L to swing pendulum-wise about a pivot E, see Figs. 2 and 3, the axes of the pivots E being parallel to the axis X X, so that the effective angle of refraction of each prism D in the plane of triangulation alters in correct proportion to the angle of sight as the instrument is directed upon a target, say, an aircraft. In this case the refracting edge will always remain horizontal, i. e., the principal plane of refraction of each prism D will be maintained vertical.

Figure 4:
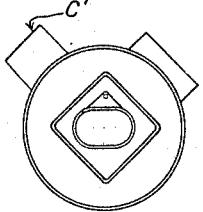
Fig. 4 is a sectional end elevation corresponding to Fig. 2 illustrating a modification.

The modification illustrated at Fig. 4 represents an instrument supported with its axis horizontal as in Fig. 1, but with its plane of triangulation directed at 45° to the horizontal plane, the eyepiece $C^1$ of the eyepiece system being so arranged that in this position observations are made by looking down perpendicularly to the plane of triangulation, a method which is frequently adopted in rangefinders for observations on aircraft.

Figures 5, 6:
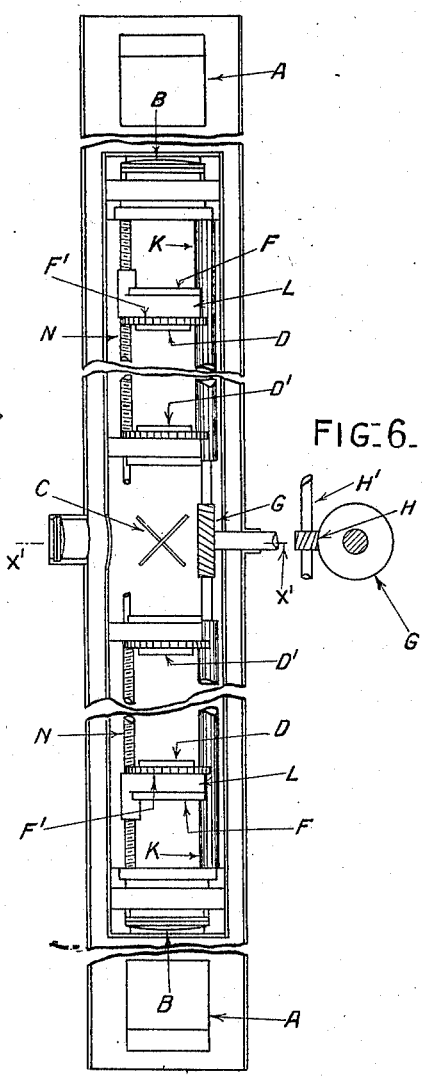
Fig. 5 is an elevation illustrating a modified form of instrument and Fig. 6 is a side view of a part thereof.

The instrument illustrated at Fig. 5 is adapted to be rotated about a horizontal axis $X^1 X^1$ at right angles to the plane of triangulation for varying angles of sight. The end reflectors A A, objectives B B, the eyepiece system C, are arranged as indicated in Fig. 1, but, in this case, the refracting prisms D D, which are adapted to be moved to and fro along the axis of the instrument, are each mounted in a carrier F and rotatable about the axis of the instrument as the angle of sight is varied in the process of directing the instrument. For these purposes gear may be provided as shown, consisting of a helical wheel G fixed to its shaft which may be controlled in position by a pendulum with a heavy bob so that as the angle of sight of the instrument is varied by rotation about the axis $X^1 X^1$ the wheel G remains stationary. Gearing with G is a helical wheel H fixed to a shaft $H^1$ to which two long pinions K are fixed, one on each side of the wheel H. In mesh with each pinion K is a gear wheel $F^1$ formed in a part with the carrier F within which the refracting prism D is mounted, the carrier F being mounted to rotate in a support L mounted upon a screw shaft N by which each support L and with it each carrier F and prism D is adapted to be moved to and fro along the axis of the instrument according to varying range, and for measurements of height rotated as the instrument is turned about the horizontal axis $X^1 X^1$ by the operation of the helical wheel H, which is caused to rotate as it revolves about the helical wheel G, transmitting its motion by the shaft $H^1$ to each of the long pinions K which thus turns each gear wheel $F^1$ and with it its carrier F and prism D.

Figure 7:
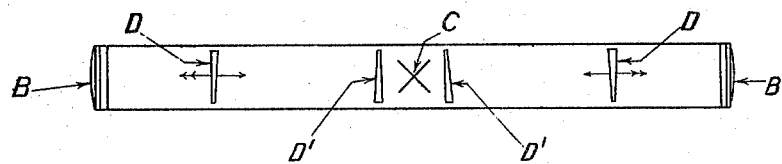
Figs. 7, 8, 9 and 10 are plan diagrams illustrating the double telescope system of an instrument embodying modifications according to this invention.

According to this invention the instruments illustrated at Figs. 1 and 5 are each provided with auxiliary prisms $D^1 D^1$ as shown in the diagram, Fig. 7. In this case $D^1 D^1$ are auxiliary prisms having equal angles of refraction each being equal to or slightly greater than the angle of refraction of the refracting prisms D D which themselves are equal. The auxiliary prisms $D^1 D^1$ are not translatable along the axis of the instrument, whereas the refracting prisms D D are, but all the prisms D D $D^1 D^1$ are similarly mounted so that the angle which the principal plane of refraction of each prism makes with the plane of triangulation varies equally in accordance with the angle of sight at which the instrument is directed, the extent and direction of angular movement relative to the plane of triangulation being equal for each prism. With this arrangement, when the refracting prisms D D are each in contact or thereabout with their associated auxiliary prisms $D^1 D^1$ respectively, the auxiliary prisms $D^1 D^1$ anul the effects of the refracting prisms D D and there is thus established an infinity condition the position of which has virtually been shifted from the eye side of the eyepiece system to the objective side thereof, in this case to the position occupied by the auxiliary prisms D¹ D¹.

Figure 8:
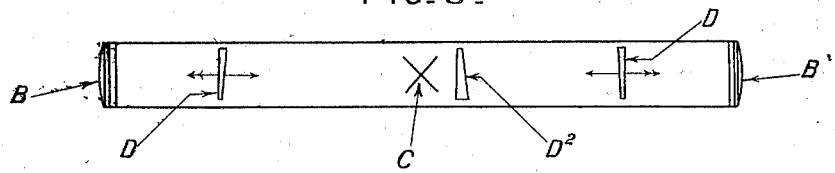

In the modification illustrated at Fig. 8, one auxiliary prism D² is provided in one of the telescopes only. In this case the angle of refraction of the prism D² is double or approximately double that of its associated refracting prism D. This prism may, as shown, be placed in the position occupied by one of the auxiliary prisms D¹, Fig. 3.

Figure 9:
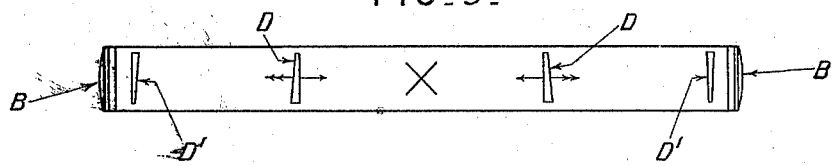
Figure 10:
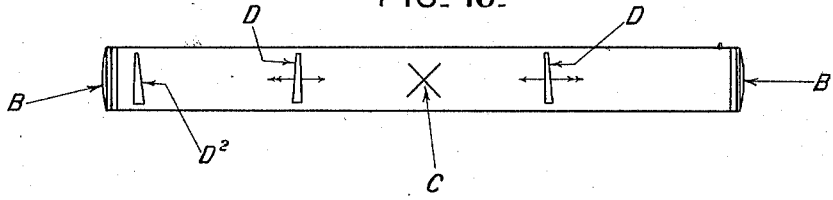

A modification of the arrangement shown at Fig. 7 is illustrated at Fig. 9. In this case the auxiliary prisms D¹ D¹ are placed each between its associated objective B and refracting prism D. In this case the infinity position is near the objective and the refracting angle of each auxiliary prism D¹ is equal to or slightly less than that of its associated refracting prism D. A similar modification of the arrangement shown at Fig. 8 is illustrated at Fig. 10. In this case the auxiliary prism D² is placed between its associated objective and refracting prism D.

We claim:

1. A self-contained base single-observer height measuring instrument of the range-finder type having a double telescope system and associated eyepiece system, a refracting prism in each telescope, means for translating each refracting prism along the axis of its telescope, an auxiliary prism provided in one of the telescopes fixed at a position on the axis of the telescope with which it is associated, by which deviation equal to or slightly greater or less than that obtained by the two refracting prisms of the telescopes is produced, and means whereby each refracting prism and the auxiliary prism is so maintained that the angle which its principal plane of refraction makes with the plane of triangulation varies in such a manner as to be always equal to the angle between the line of sight and the vertical, for the purposes set forth.

2. A self-contained base single-observer height measuring instrument of the range-finder type having a double telescope system and associated eyepiece system, a refracting prism in each telescope, means for translating each refracting prism along the axis of its telescope, two auxiliary prisms one in each of the telescopes, each fixed at a position on the axis of the telescope with which it is associated, by which deviation equal to or slightly greater or less than that obtained by the two refracting prisms of the telescopes is produced, and means whereby each refracting prism and each auxiliary prism is so maintained that the angle which its principal plane of refraction makes with the plane of triangulation varies in such a manner as to be always equal to the angle between the line of sight and the vertical, for the purposes set forth.

3. A self-contained base single-observer height measuring instrument of the range-finder type having a double telescope system and associated eyepiece system, a refracting prism in each telescope, means for translating each refracting prism along the axis of its telescope, an auxiliary prism provided in one of the telescopes fixed at a position between the eyepiece system and refracting prism on the axis of the telescope with which it is associated, by which deviation equal to or slightly greater than that obtained by the two refracting prisms of the telescopes is produced, and means whereby each refracting prism and the auxiliary prism is so maintained that the angle which its principal plane of refraction makes with the plane of triangulation varies in such a manner as to be always equal to the angle between the line of sight and the vertical, for the purposes set forth.

4. A self-contained base single-observer height measuring instrument of the range-finder type having a double telescope system and associated eyepiece system, a refracting prism in each telescope, means for translating each refracting prism along the axis of its telescope, two auxiliary prisms, one in each of the telescopes, each fixed at a position between the eyepiece system and refracting prism on the axis of the telescope with which it is associated, by which deviation equal to or slightly greater than that obtained by the two refracting prisms of the telescopes is produced, and means whereby each refracting prism and each auxiliary prism is so maintained that the angle which its principal plane of refraction makes with the plane of triangulation varies in such a manner as to be always equal to the angle between the line of sight and the vertical, for the purposes set forth.

5. A self-contained base single-observer height measuring instrument of the range-finder type having a double telescope system and associated eyepiece system, a refracting prism in each telescope, means for translating each refracting prism along the axis of its telescope, an auxiliary prism provided in one of the telescopes fixed at a position on the axis of the telescope with which it is associated, by which deviation equal to or slightly greater or less than that obtained by the two refracting prisms of the telescopes is produced, and gear mechanism for each prism whereby each refracting prism and the auxiliary prism is so maintained that the angle which its principal plane of refraction makes with the plane of triangulation varies in such a manner as to be always equal to the angle between the line of sight and the vertical, for the purposes set forth.

6. A self-contained base single-observer height measuring instrument of the range-finder type having a double telescope system and associated eyepiece system, a refracting prism in each telescope, means for translating each refracting prism along the axis of its telescope, two auxiliary prisms one in each of the telescopes, each fixed at a position on the axis of the telescope with which it is associated, by which deviation equal to or slightly greater or less than that obtained by the two refracting prisms of the telescopes is produced, and gear mechanism for each prism whereby each refracting prism and each auxiliary prism is so maintained that the angle which its principal plane of refraction makes with the plane of triangulation varies in such a manner as to be always equal to the angle between the line of sight and the vertical, for the purposes set forth.

7. A self-contained base single-observer height measuring instrument of the range-finder type having a double telescope system and associated eyepiece system, a refracting prism in each telescope, means for translating each refracting prism along the axis of its telescope, an auxiliary prism provided in one of the telescopes fixed at a position between the eyepiece system and refracting prism on the axis of the telescope with which it is associated, by which deviation equal to or slightly greater than that obtained by the two refracting prisms of the telescopes is produced, and gear mechanism for each prism whereby each refracting prism and the auxiliary prism is so maintained that the angle which its principal plane of refraction makes with the plane of triangulation varies in such a manner as to be always equal to the angle between the line of sight and the vertical, for the purposes set forth.

8. A self-contained base single-observer height measuring instrument of the range-finder type having a double telescope system and associated eyepiece system, a refracting prism in each telescope, means for translating each refracting prism along the axis of its telescope, two auxiliary prisms, one in each of the telescopes, each fixed at a position between the eyepiece system and refracting prism on the axis of the telescope with which it is associated, by which deviation equal to or slightly greater than that obtained by the two refracting prisms of the telescopes is produced, and gear mechanism for each prism whereby each refracting prism and each auxiliary prism is so maintained that the angle which its principal plane of refraction makes with the plane of triangulation varies in such a manner as to be always equal to the angle between the line of sight and the vertical, for the purposes set forth.

ARCHIBALD BARR.
WILLIAM STROUD.

Copies of this patent may be obtained for five cents each, by addressing the "Commissioner of Patents, Washington, D. C."